United States Patent [19]

Kieper

[11] Patent Number: 4,485,764

[45] Date of Patent: Dec. 4, 1984

[54] APPARATUS FOR THE CONTROLLED FEEDING OF LABORATORY TEST ANIMALS

[76] Inventor: Joachim Kieper, Maienbass 25, 2357 Bad Bramstedt, Fed. Rep. of Germany

[21] Appl. No.: 522,912

[22] Filed: Aug. 12, 1983

[30] Foreign Application Priority Data

Aug. 13, 1982 [DE] Fed. Rep. of Germany ....... 3230155

[51] Int. Cl.³ .......................... A01K 5/00; A01K 1/03
[52] U.S. Cl. .......................................... 119/18; 119/63
[58] Field of Search ..................................... 119/18, 63

[56] References Cited

U.S. PATENT DOCUMENTS

| | | | |
|---|---|---|---|
| 3,002,492 | 10/1961 | Naturale | 119/18 |
| 3,334,614 | 8/1967 | Gass et al. | 119/18 |
| 3,358,649 | 12/1967 | Gabriel et al. | 119/18 |
| 3,572,293 | 3/1971 | Schroen | 119/18 |
| 3,785,345 | 1/1974 | Rhinehart et al. | 119/18 |
| 3,951,105 | 4/1976 | Mehn | 119/18 |

Primary Examiner—Hugh R. Chamblee

[57] ABSTRACT

The invention is an apparatus for the controlled feeding of animals in a cage. A cover-mounted rack is adapted to be supported on the side walls of the cage. The cover-mounted rack includes a horizontal portion and a well portion with a fodder access part therein. A base plate is mounted on the aforesaid horizontal portion and has means defining a first axis. A tiltable frame member is pivotably associated with the base member for movement from a first position to a second position about the first axis. A fodder container means having means therein for the passage of fodder therethrough operably associated with said tiltable frame member. In the first position, the fodder container means for the passage of fodder therethrough, cooperates with the well access port wherein the fodder is presented to the animal for feeding. In the second position, the fodder container means is removed from the well and access by the animal to the food is prevented.

12 Claims, 4 Drawing Figures

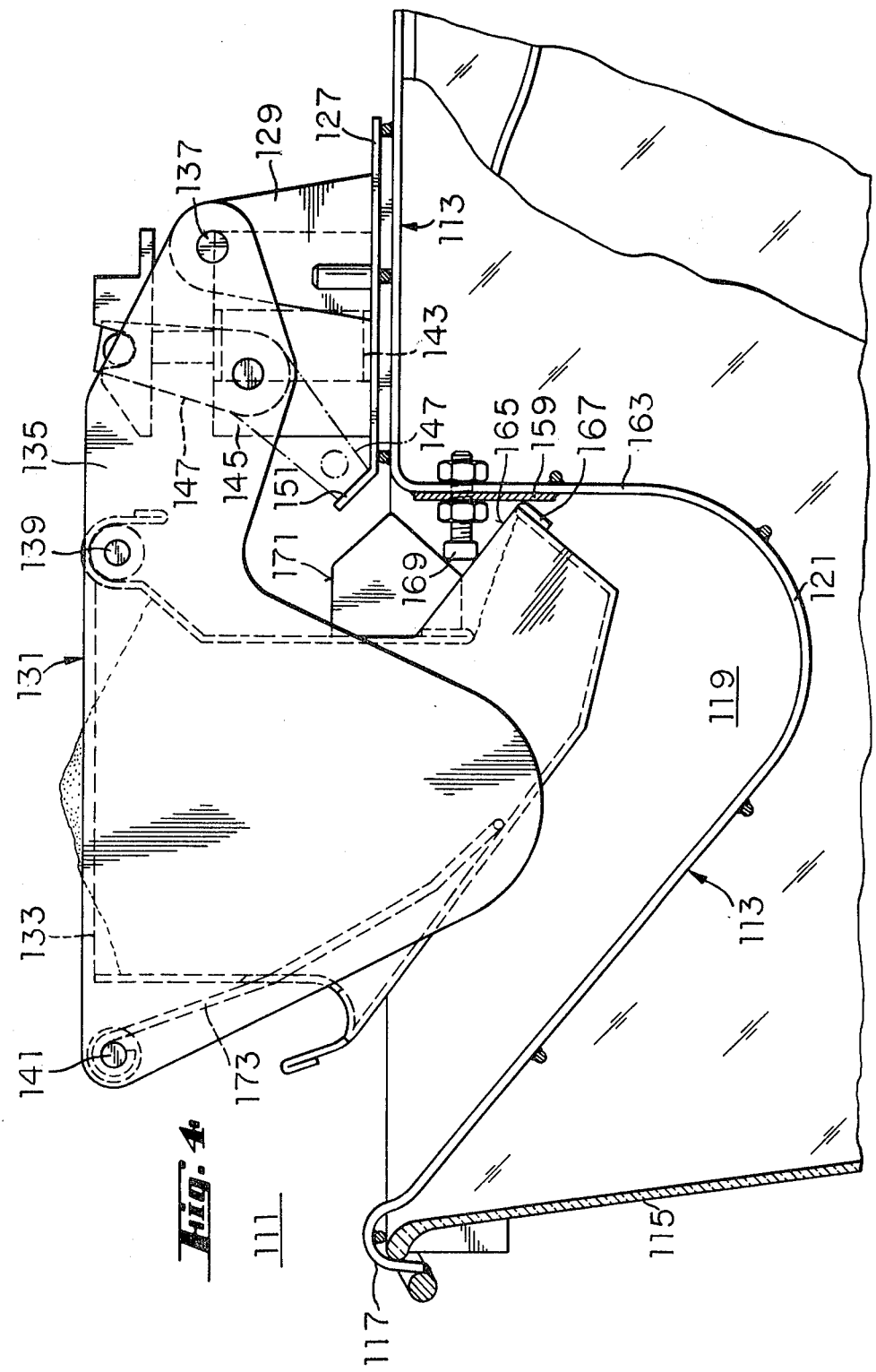

APPARATUS FOR THE CONTROLLED FEEDING OF LABORATORY TEST ANIMALS

FIELD OF THE INVENTION

The invention relates to controllable or automatic feeding devices. More particularly, the present invention is directed to such a feeding apparatus for use in combination with laboratory animal cages fitted with a cover-mounted rack.

BACKGROUND OF THE INVENTION

It is typical, in a variety of scientific endeavors, to employ test animals, and for various reasons, it is often necessary to control the food available to and consumed by the animals. This necessity occurs during, for example, research directed to the metabolic process and energy balance of an individual animal, the effectiveness and safety of medications, and nutrition physiology. It is a common practice to manually present the food to and remove it from the animal in order to control food availability. Such a manual procedure is clearly time consuming, expensive and unsuitable for long term tests which are often required in some of the experiments as described above.

It is known to use automatic feeders consisting of a plurality of fodder pans which are arranged on the periphery of a rotatable circular table. The table rotates at a uniform speed and the experimental animal has access, via a wire cage passage to a fodder pan as it passes from time to time in front of the wire cage passage. The time at which the food is available and the duration of the feed are controlled by the rotational speed of the circular table. Such a feeding apparatus requires the use of a special cage arrangement within the laboratory and is usually quite expensive. Moreover, the rotatable circular table device limits the area within the cage available for the animal's movement.

It is also known to use a feeding apparatus consisting of a tracked system on which fodder baskets are moved vertically on guide rails into and out of a series of cages. While the tracked system is useful when a plurality of aligned cages are used, individual feeding of the animals in selected cages is inhibited. Moreover, the tracked system requires the use of specially constructed cages which cooperate with the tracked fodder baskets.

It is, therefore, an object of this invention to provide an automatic or controllable feeding apparatus which is readily adaptable for use with a typical laboratory animal holding cage and which does not restrict the room available to the animal in the cage.

It is also an object of this invention to provide an apparatus, for the controlled feeding of laboratory test animals, which is economical to manufacture and maintain. The apparatus itself can be manually operated or it can be fully automatic when provided with the appropriate accessories.

It is still another object of this invention to provide a controllable feeding apparatus which substantially eliminates a danger common in the presently utilized automatic feeding devices, that is, the injuring of an animal during the presentation or removal of fodder baskets from the animal's cage.

SUMMARY OF THE INVENTION

The invention is an apparatus for the controlled feeding of animals in a cage. A cover-mounted rack is adapted to be supported on the side walls of the cage. The cover-mounted rack includes a horizontal portion and a well portion with a fodder access port therein. A base plate is mounted on the aforesaid horizontal portion and has means defining a first axis. A tiltable frame member is pivotably associated with the base member for movement from a first position to a second position about the first axis. A fodder container means having means therein for the passage of fodder therethrough is operably associated with said tiltable frame member. In the first position, the fodder container means for the passage of fodder therethrough, cooperates with the well access port wherein the fodder is presented to the animal for feeding. In the second position, the fodder container means is removed from the well, and access by the animal to the food is prevented.

In one embodiment, the fodder container means is fixedly mounted to the tiltable frame member, while in a second embodiment, a fodder container is mounted in the tiltable frame member for independent rotational movement relative thereto. The movement of the tiltable frame member can be effected manually or through an automatic motive means such as an electric motor, pneumatic or hydraulic jack.

BRIEF DESCRIPTION OF THE DRAWINGS

The above, as well as other features and advantages of the present invention, will become apparent through a consideration of the detailed description of the invention in conjunction with the several drawings in which:

FIG. 4 is a side elevational view of the apparatus of FIG. 3 in the fodder removal position.

DETAILED DESCRIPTION OF THE INVENTION

Figure 1:
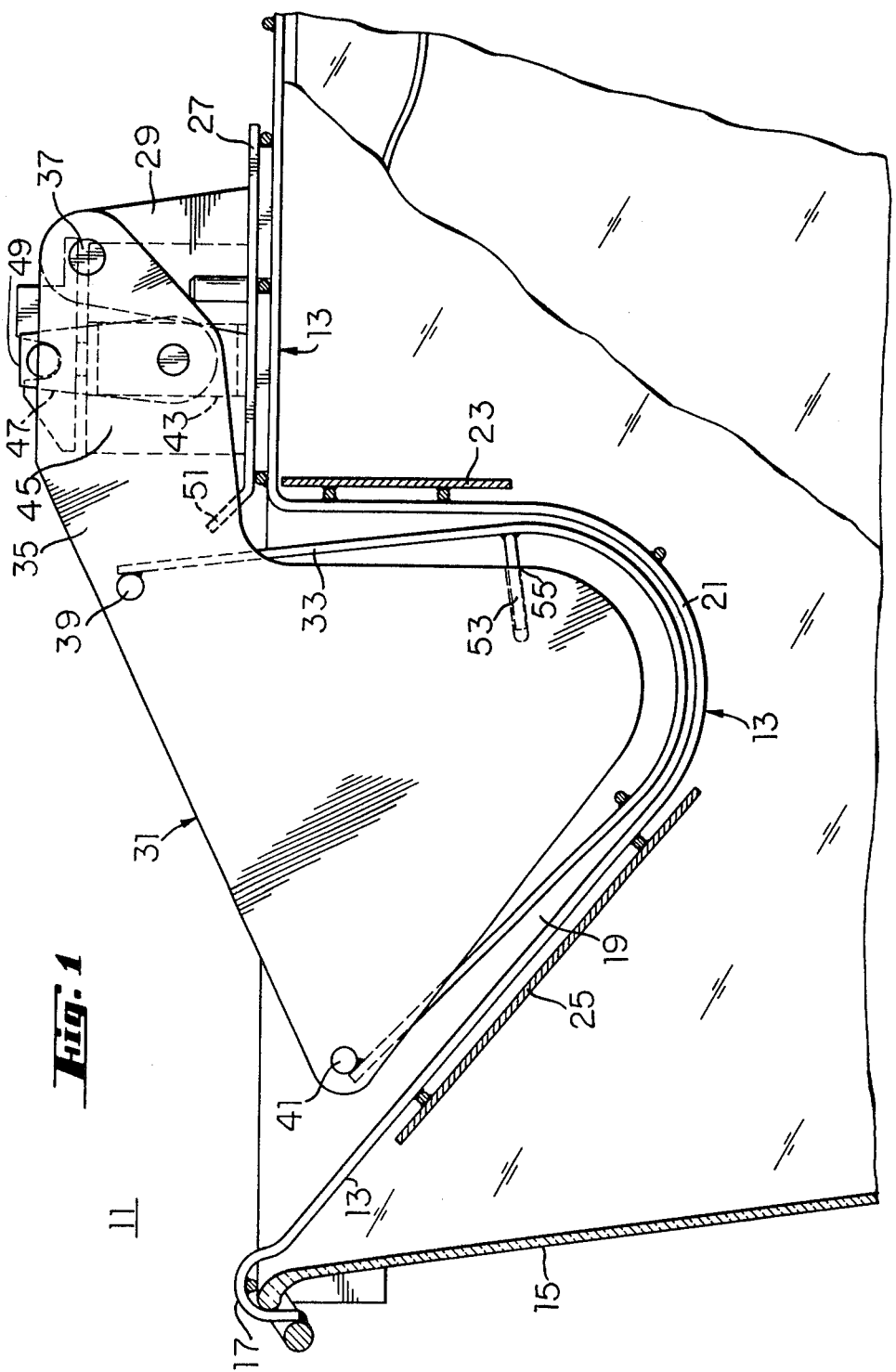
FIG. 1 is a side elevational view of an apparatus according to this invention with a fodder basket in the feeding position.
Figure 2:
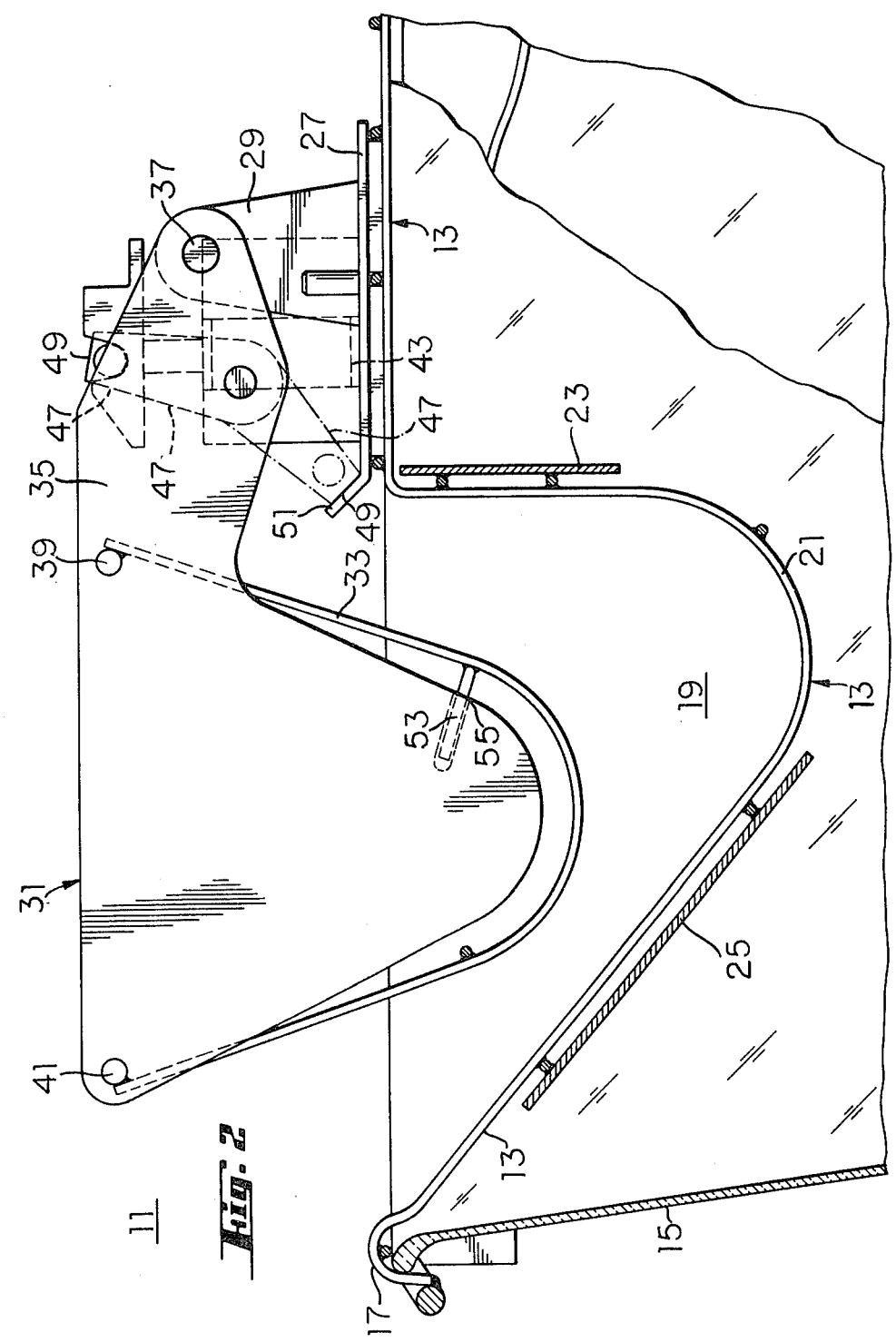
FIG. 2 is a side elevation view of the apparatus of FIG. 1 in the fodder removal position.

Considering both FIGS. 1 and 2, a first embodiment of the controlled feeding apparatus according to this invention is generally indicated by the reference character 11. The feeding apparatus 11 includes a cover-rack 13 which is adapted to be mounted over an opening in the laboratory animal cage 15, only a portion of which is illustrated. The cover-rack 13 is a barred member of cage-like structure with a mounting lip 17 at each end thereof which is adapted to rest on the side walls of the cage 15. A depressed portion of the cover-rack 13 forms a well 19 which has a food access port as at 21. Means such as the plates 23 and 25 can be attached to the generally vertical portions of the well 19 in order to more clearly define a specific access port 21. The feeding apparatus 11 also includes a base plate 27 mounted on a generally horizontal portion of the cover-rack 13. The base plate 27 has a pair of upwardly extending brackets 29 which support in a cantilevered fashion a tiltable frame means 31 adapted to receive therein a food container means such as a fodder basket 33. The tiltable frame means 31 is movable from a first position in which the fodder basket 33 is presented to the animal for fodder availability to a second position in which the fodder basket 33 is removed from the animal.

The tiltable frame member 31 includes a pair of arm-like members 35 rotatably mounted on the brackets 29 for movement about a first axis 37. The arms 35 are maintained in a spaced relationship by means of locking pins 39 and 41 which pins are also adapted to removably receive and hold fodder basket 33 therein. Means are also provided to lift and/or support the tiltable frame 31 in the second or fodder removal position. For a fully automatic feeding apparatus, a motorized, hydraulic or pneumatic device, schematically represented as at 43, is provided on the base plate 27 and is in communication with the frame 31 to move the same between the first and second positions. An appropriate control circuit or timing device as at 45 can be integrated with the device 43 in order to provide a fully automatic feeding system.

The tiltable frame 31 is also provided with a manual lifting arm 47 which is rotatably mounted on one of the arm-like members 35. While two such lifting arms 47 can be provided, one for each of the pair of arm-like members 35, one such lifting arm is generally sufficient. When the tiltable frame 31 is raised into the second position, the lifting arm 47 can be rotated into a supporting position in which the free end 49 thereof engages and rests against an angled bearing surface 51. When rotated into this position, the lifting area 47 positively supports the tiltable frame 31 in the raised second position.

A rod 53 is attached to the fodder basket 33 and extends therefrom into an opening 55 in the tiltable frame 31.

As indicated above, a fodder basket 33 is supported within the tiltable frame 31, comprising a wire mesh structure adapted to receive and retain therein an animal feed. It should be appreciated that because of the variety of forms of dry food-stuffs available for laboratory animals, the exact nature of the wire mesh structure may be modified to accommodate these food-stuffs. For example, finger thick pellets could be made available to the animals using a fodder basket whose wire mesh structure forms apertures of approximately 8 mm in width. As will be more fully explained in conjunction with the embodiment illustrated in FIGS. 3 and 4, a fodder container can be utilized when small pellets, granulates, bran and meal are the selected feed. In any event, by selecting a particular mesh size for the well 19 area of the cover-rack 13 and for the fodder basket 33, the size of the food access can be manipulated. By the positioning of the wire mesh of the cover-rack 13 and the fodder basket 33 with respect to each and the fodder basket 33 with respect to each other, it is possible to vary the width of the openings through which the fodder must pass, so that, depending upon whether the wire meshes overlap exactly or are displaced relative to each other, it is possible to reduce the access port 21 to one-half its original size.

In FIG. 1, the apparatus is shown in the first position in which the fodder basket 33 is lowered into the well and the fodder is thus adjacent the access port 21 area so that fodder is available to the animal. In FIG. 2, the apparatus is shown in the second position in which the fodder is removed from the animal. The tiltable frame 31 is lifted, thus removing the fodder basket 33 from the well 19. In the case of automatic feeding, the tiltable frame and fodder basket are held in the second position by the lifting device 43 until the next feeding. In the case of manual operation, as illustrated in dash-dot line, the tiltable frame 31 is held in position by lifting arm 47.

Figure 3:
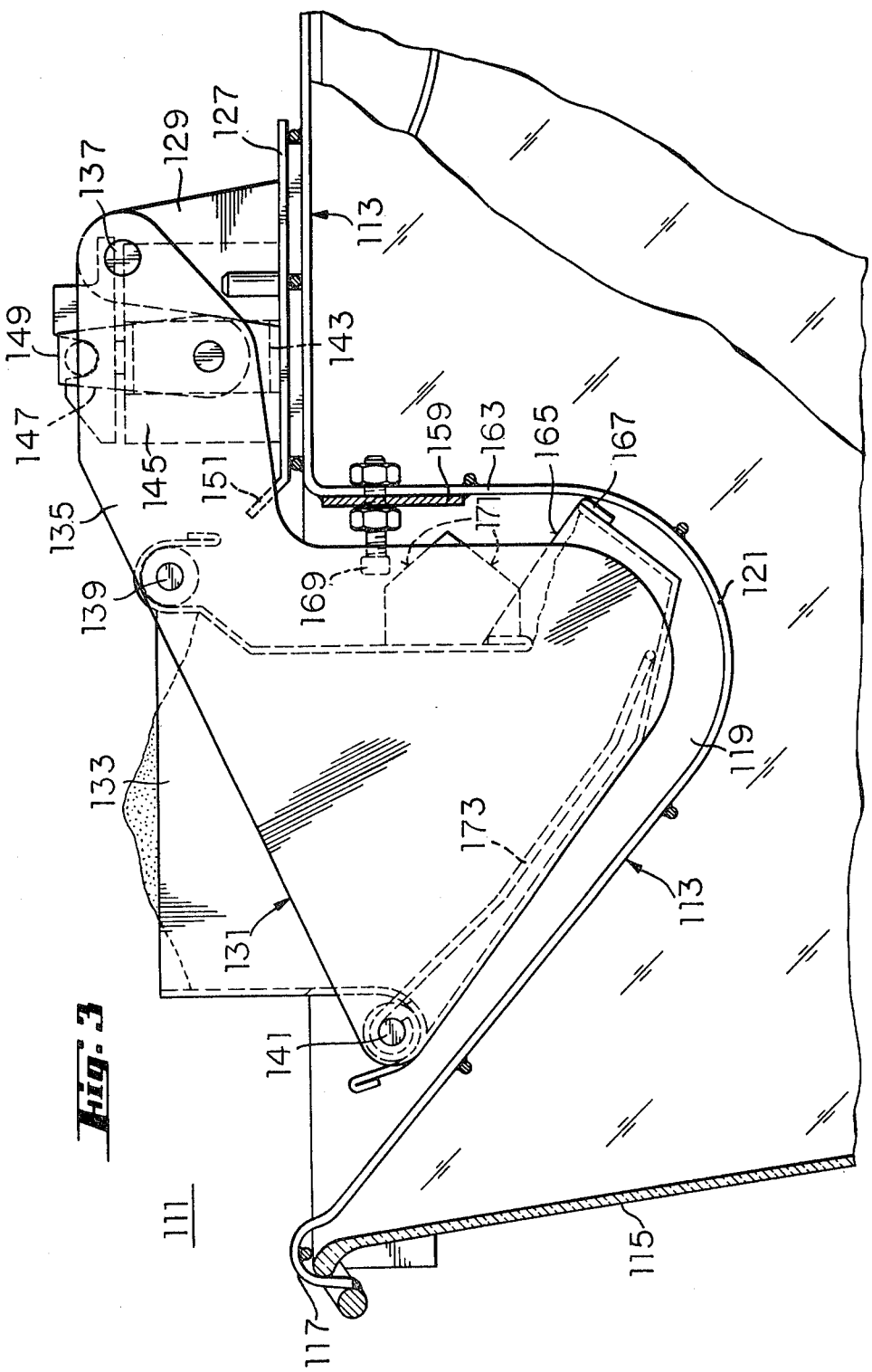
FIG. 3 is a side elevational view of an alternative embodiment of the apparatus of this invention with a fodder container in the feeding position.

An alternative embodiment of the present invention for use with a fodder container as opposed to the basket described above is illustrated in the first position and second position in FIGS. 3 and 4 respectively. The controlled feeding apparatus 111 includes a cover-rack 113 which is adapted to be mounted on the animal's cage 115, only a portion of which is illustrated, by means of mounting lips 117 at each end thereof. A depressed portion of the cover-rack 113 forms a well 119 which has a food access port as at 121. The feeding apparatus also includes a base plate 127 mounted on a generally horizontal portion of the cover-rack 113. The base plate 127 has a pair of upwardly extending brackets 129 which support in a cantilevered fashion a tiltable frame means 131 adapted to receive therein a fodder container 133. The tiltable frame means 131 is moveable from a first position in which the fodder container is presented to the animal into a second position, (as shown in FIG. 4) in which the fodder container is removed from the well 119 and the animal.

The tiltable frame member 131 includes a pair of arm-like members 135 rotatably mounted on the bracket 129 for movement about a first axis 137. The arms 135 are maintained in a spaced relationship by means of locking pins 139 and 141. The pins 139 141 are adapted to removably receive and rotatably hold the fodder container in the tiltable frame 131. Means are also provided to lift and/or support the tiltable frame 131 in the second position. For a fully automatic feeding apparatus, a motorized, hydraulic or pneumatic device, schematically represented as at 143 is provided on the base plate 127 and is operatively associated with the tiltable frame 131 to move the same between the first and second positions. An appropriate control circuit or timing device as at 145 can be integrated with the device 143 in order to provide a fully automatic feeding system.

The tiltable frame 131 is also provided with a manual lifting arm 147 which is rotatably mounted on one of the arm-like members 135. When the tiltable frame 131 is raised into the second position, the lifting arm 147 can be rotated into a supporting position in which the free end thereof 149 engages and rests against an angled bearing surface 151. When rotated into the supporting position, as shown in dash-dot in FIG. 4, the lifting arm 147 positively supports the tiltable frame 131 in the raised second position.

The fodder container 133 is provided with an enclosed base portion as at 161 for the purpose of retaining small pellets, bran and meal-like fodder as previously described. The fodder container 133 is rotatably suspended from the pin 139 of the tiltable frame 131 so as to be braised toward the vertical section 163 of the cover-rack 113. The fodder container 133 includes a feed access port 165 which corresponds with the cover-rack food access 121 when the apparatus is in the first position.

This embodiment includes several features which are particularly directed to the safety of the laboratory animal during the movement of the fodder container 133 from one position to the other position. In order to prevent a animal from being caught by the raising fodder container 133 or squeezed between the vertical plate 159 and the lip 167 of the access port, means are provided to automatically lift and rotate the bin container out away from the cover-rack access port 121. A cam-like device 169 is provided on the vertical section 163 of the cover-rack 113, projecting outwardly therefrom toward the fodder container 133. The fodder container 133 includes a track-like surface 171 which cooperates with the cam 169 to urge the pivotably mounted fodder container 133 out away from the vertical section and the access port 121 of the cover-rack 113. Thus, a potential danger zone in which the animal could be caught between the fodder container 133 and the cover-rack 113 is eliminated because the cam lifts the fodder container 133 out away from the danger zone and, when beyond this danger zone, it guides the fodder container 133 back into a normal, generally horizontal position.

Another common problem which troubles any type of animal feeder is successfully eliminated by an additional feature of this invention. That problem is "bridge formation" which occurs when pellet or meal-like fodder tends to form an arch-like structure within a container. The bridge substantially hinders the movement or flow of fodder within the container with the result that the animal may not be able to obtain food from what appears to be a full container of fodder. The present apparatus provides poker bars as at 173 which are mounted on pin 141 of the tiltable frame 131. The poker bars 173 which may consists of one or more elongated members pivotally associated with the pin 141 and depending into the fodder container 133, tend to mix or break up the fodder. During the movement of the apparatus from one position to the other position, the relative movement between the fodder container 133 and the tiltable frame 131 causes the poker bar 173 to move through the fodder and break up any bridge formation therein.

Still another feature of this invention resides in the fact that the several individual components of this device can be fastened together with removable securing means such as screws, interlocking components or the like. As a result, it is possible for untrained personnel to replace damaged or worn parts very quickly or to quickly dismantle the apparatus for cleaning.

The invention, as described hereinabove in the context of a preferred embodiment, is not to be taken as limited to all of the provided details thereof, since, modifications and variations thereof may be made without departing from the spirit and scope of the invention.

What is claimed is:

1. An apparatus for the controlled feeding of animals in a cage having side walls comprising a cover-mounted rack adapted to be supported by said side walls, said cover-mounted rack having a horizontal portion and a well-like portion with an access port defined therein, a base member, mounted on said horizontal portion having means defining a first axis, a tiltable frame member pivotably associated with said base member for movement from a first position to a second position about said first axis, and a fodder container means operably associated with said tiltable frame member, said fodder container having means therein for the passage of fodder therethrough, such that when said tiltable frame member is in said first position, said fodder container means for the passage of fodder therethrough is in communication with said access port wherein the fodder is presented to an animal and when said tiltable frame member is in said second position, fodder access is removed from the animal.

2. The apparatus according to claim 1 including a lifting arm pivotably associated with the tiltable frame member and a bearing surface associated with the base member, said lifting arm being pivotable into a cooperating relationship with said bearing surface to retain the tiltable frame in the second position.

3. The apparatus according the claim 1 including means for effecting the movement of the tiltable frame member between the first and the second position mounted on the base member and operably associated with said tiltable frame member.

4. The apparatus according to claim 3 including control means operatively associated with the movement effecting means for the selected activation thereof.

5. The apparatus according to claim 4 wherein the movement effecting means is a device selected from the group consisting of an electric motive means, a pneumatic jack and a hydraulic jack.

6. The apparatus according to claim 1 wherein the tiltable frame member comprises a pair of arm-like members mounted for rotational movement about the first axis and a pair of locking pins operably associated therewith to maintain said arm-like members in a spaced apart relationship.

7. The apparatus according to claim 6 wherein the 2 fodder container means is mounted on at least one of the 3 pair of locking pins.

8. The apparatus according to claim 7 wherein the fodder container means is fodder basket having a wire mesh bottom portion adapted to cooperate with the well access port, said fodder basket supported within the tiltable frame member by both pins of the pair of locking pins.

9. The apparatus according to claim 7 wherein the fodder container means is a fodder container with an enclosed bottom section adapted to hold pellet-like fodder, and said container is rotatably mounted about one of said pins for independent pivotal movement during the movement of the tiltable frame between the first and second positions.

10. The apparatus according to claim 9 in which the fodder container is rotatably mounted on one of the pair of locking pins and including poker means rotatably mounted on the other pin of said pair of locking pins, said poker means being elongated members which interact with the fodder within the container during the movement of said fodder container relative to the tiltable frame means in order to inhibit "bridge formation" within the fodder.

11. The apparatus according to claim 9 wherein the well portion of the cover-mounted rack includes means for effecting the independent movement of the fodder container out and away from the well access port during the movement of the tiltable frame between the first and second positions.

12. The apparatus according to claim 11 wherein the means for effecting the independent movement includes a cam-like member mounted in the well portion of cover-mounted rack and a track-like member mounted on the fodder container which track-like member cooperates with said cam-like member.

* * * * *